(12) United States Patent
McNicol et al.

(10) Patent No.: US 9,559,778 B2
(45) Date of Patent: Jan. 31, 2017

(54) OPTICAL DISPERSION COMPENSATION IN THE ELECTRICAL DOMAIN IN AN OPTICAL COMMUNICATIONS SYSTEM

(75) Inventors: John McNicol, Ottawa (CA); Kieran Parsons, Ottawa (CA); Leo Strawczynski, Ottawa (CA); Kim B. Roberts, Nepean (CA); Maurice S. O'Sullivan, Ottawa (CA)

(73) Assignee: CIENA CORPORATION, Hanover, MD (US)

( * ) Notice: Subject to any disclaimer, the term of this patent is extended or adjusted under 35 U.S.C. 154(b) by 3133 days.

(21) Appl. No.: 10/531,314

(22) PCT Filed: Jul. 11, 2003

(86) PCT No.: PCT/CA03/01044
§ 371 (c)(1),
(2), (4) Date: Sep. 10, 2007

(87) PCT Pub. No.: WO2004/032385
PCT Pub. Date: Apr. 15, 2004

(65) Prior Publication Data
US 2006/0078336 A1 Apr. 13, 2006

Related U.S. Application Data

(63) Continuation-in-part of application No. 10/262,944, filed on Oct. 3, 2002, now Pat. No. 7,382,984.

(51) Int. Cl.
*H04B 10/516* (2013.01)
*H04B 10/50* (2013.01)
(Continued)

(52) U.S. Cl.
CPC ...... *H04B 10/505* (2013.01); *H04B 10/25137* (2013.01); *H04B 10/508* (2013.01); *H04B 10/50597* (2013.01)

(58) Field of Classification Search
CPC .................................................. H04B 10/5051
(Continued)

(56) References Cited

U.S. PATENT DOCUMENTS

| 5,148,503 A | 9/1992 | Skeie |
|---|---|---|
| 5,301,058 A | 4/1994 | Olshansky |

(Continued)

FOREIGN PATENT DOCUMENTS

| EP | 0 524 758 | 1/1993 |
|---|---|---|
| EP | 0 971 493 | 1/2000 |

(Continued)

OTHER PUBLICATIONS

"Vectors—The dot product, parallel vectors, and orthogonal vectors", downloaded from site "http://cmsweb1.lcps.org/50912552612420/lib/50912552612420/MA_NS2_Vectors.pdf", Jan. 16, 2011.*

(Continued)

*Primary Examiner* — Shi K Li
(74) *Attorney, Agent, or Firm* — Integral Intellectual Property Inc.; Miriam Paton; Amy Scouten

(57) ABSTRACT

Optical dispersion imposed on a communications signal conveyed through an optical communications system is compensated by modulating the communications signal in the electrical domain. A compensation function is determined that substantially mitigates the chromatic dispersion. The communications signal is then modulated in the electrical domain using the compensation function. In preferred embodiments, compensation is implemented in the transmitter, using a look-up-table and digital-to-analog converter to generate an electrical predistorted signal. The electrical predistorted signal is then used to modulate an optical source to generate a corresponding predistorted optical signal for transmission through the optical communications system.

44 Claims, 9 Drawing Sheets

(51) Int. Cl.
   *H04B 10/2513* (2013.01)
   *H04B 10/508* (2013.01)

(58) Field of Classification Search
   USPC .......................................................... 398/193
   See application file for complete search history.

(56) References Cited

U.S. PATENT DOCUMENTS

| | | | |
|---|---|---|---|
| 5,311,346 A | 5/1994 | Haas et al. | |
| 5,349,312 A | 9/1994 | Huettner et al. | |
| 5,408,498 A | 4/1995 | Yoshida | |
| 5,416,626 A | 5/1995 | Taylor | |
| 5,446,574 A | 8/1995 | Djupsjobacka et al. | |
| 5,450,044 A * | 9/1995 | Hulick | 332/103 |
| 5,513,029 A | 4/1996 | Roberts | |
| 5,579,328 A | 11/1996 | Habel et al. | |
| 5,761,225 A | 6/1998 | Fidric et al. | |
| 5,850,305 A * | 12/1998 | Pidgeon | 398/193 |
| 5,892,858 A | 4/1999 | Vaziri et al. | |
| 5,949,560 A | 9/1999 | Roberts et al. | |
| 5,999,258 A | 12/1999 | Roberts | |
| 6,067,180 A | 5/2000 | Roberts | |
| 6,072,364 A * | 6/2000 | Jeckeln et al. | 330/149 |
| 6,115,162 A | 9/2000 | Graves et al. | |
| 6,124,960 A | 9/2000 | Garthe et al. | |
| 6,128,111 A | 10/2000 | Roberts | |
| 6,205,262 B1 | 3/2001 | Shen | |
| 6,262,834 B1 | 7/2001 | Nichols et al. | |
| 6,304,369 B1 | 10/2001 | Piehler | |
| 6,310,709 B1 * | 10/2001 | Bergano | 398/185 |
| 6,404,535 B1 * | 6/2002 | Leight | 359/306 |
| 6,424,444 B1 * | 7/2002 | Kahn et al. | 398/141 |
| 6,441,932 B1 | 8/2002 | Helkey | |
| 6,473,013 B1 | 10/2002 | Velazquez et al. | |
| 6,522,439 B2 * | 2/2003 | Price et al. | 398/194 |
| 6,559,994 B1 | 5/2003 | Chen et al. | |
| 6,580,532 B1 | 6/2003 | Yao et al. | |
| 7,546,041 B2 * | 6/2009 | Griffin | 398/188 |
| 7,587,143 B2 * | 9/2009 | Sinha et al. | 398/159 |
| 2001/0028760 A1 | 10/2001 | Yaffe | |
| 2002/0018268 A1 | 2/2002 | Price et al. | |
| 2002/0024694 A1 | 2/2002 | Newell et al. | |
| 2002/0106148 A1 | 8/2002 | Schemmann et al. | |
| 2003/0011847 A1 | 1/2003 | Dai et al. | |

FOREIGN PATENT DOCUMENTS

| | | |
|---|---|---|
| EP | 1 223 694 | 7/2002 |
| EP | 1 237 307 | 9/2002 |
| WO | WO 01/03339 | 1/2001 |
| WO | WO 01/91342 | 11/2001 |
| WO | WO 02/43340 | 5/2002 |

OTHER PUBLICATIONS

Adaptive Electronic Linearization of Fiber Optic Links, OFC 2003, vol. 2, pp. 477-480, Mar. 2003 Sadhwani et al.
Automated Measurement of Polarization Mode Dispersion Using Jones Matrix Eigenanalysis, IEE PhotonicsTechnology Letters, vol. 4, No. 9, pp. 1066-1069, Sep. 1992, Heffner.
Chromatic Dispersion Mapping by Sensing the Power Distribution of Four-Wave Mixing Along the Fiber Using Brillouin Probing, OFC 2003, vol. 2, pp. 714-716, Herraez et al.
Design of Broad-Band PMD Compensation Filters, IEEE Photonics Technology Letters, vol. 14, No. 8, Aug. 2002, A. Eyal et al.
Dispersion Compensation by Active Predistorted Signal Synthesis, Journal of Lightwave Technology, vol. LT-3, No. 4, Aug. 1985, Thomas L. Koch and Rod C. Alfemess.
Dispersion Compensation with an SBS-Suppressed Fiber Phase Conjugator Using Synchronized Phase Modulation, OFC 2003, vol. 2, pp. 716-717, M. Tani.
Electrical Signal Processing Techniques in Long-Haul Fiber-Optic Systems, 1990 IEEE—Transactions on Communications, vol. 38, No. 9, Jack H. Winters, et al.
Exact Compensation for both Chromatic Dispersion and Kerr Effect in a Transmission Fiber Using Optical Phase Conjuction, Journal of Lightwave Technology, vol. 14, No. 3, Mar.
High-Dynamic-Range Laser Amplitude and Phase Noise Measurement Techniques, IEEE Journal on Selected Topics in Quantum Electronics, vol. 7, No. 4, Jul./Aug. 2001, Ryan P. Sc.
Measurement of High-Order Polarization Mode Dispersion, IEEE Photonics Technology Letters, vol. 12, No. 7, Jul. 2000, Yi Li et al.
Mitigation of Dispersion-Induced Effects Using SOA in Analog Optical Transmission, IEEE Photonics Technology Letters, vol. 14, No. 8, Aug. 2002, Duk-Ho Jeon et al.
Performance of Smart Lightwave Receivers With Linear Equalization, Journal of Lightwave Technology, vol. 10, No. 8, Aug. 1992, John C. Cartledge, et al.
Polarization Effects in Lightwave Systems, Craig. D. Poole and Jonathan Nage. Date unknown.
Polarization Modulated Direct Detection Optical Transmission Systesm, Journal of Lightwave Technology, vol. 10, No. 12, Dec. 1992.
Predistortion of Electroabsorption Modulators for Analog CATV Systems at 1.55 •m, Journal of Lightwave Technology, vol. 15, No. 9, Sep. 1997, Gordon C. Wilson et al.
Predistortion Techniques for Linearization of External Modulators, 1999 IEEE—Gordon Wilson, Lucent Technologies, NJ 07733, U.S.A.
Reduction of Dispersion-Induced Distortion in SCM Transmission Systems by Using Predistortion-Linearized MQW-EA Modulatirs, Journal of Lighwave Technology, vol. 15, No. 2, Fe.
Representation of Second-Order Polarisation Mode Dispersion, Electronics Letters, vol. 35, No. 19, Sep. 16, 1999, A. Eyal et al.
Signal Distortion and Noise in AM-SCM Transmission Systems Employing the Feedfrorward Linearized MQW-EA External Modulator, Journal of Lightwave Technology, vol. 15, No. 8, Au.
Soliton Transmission Using Periodic Dispersion Compensation, Journal of Lightwave Technology, vol. 15, No. 10, Oct. 1997, Nicholas J. Smith et al.
Theoretical Basis of Polarization Mode Dispersion Equalization up to the Second Order, Journal of Lightwave Technology, vol. 18, No. 4, Apr. 2000, Teruhiko Kudou et al.
H. Gysel et al. "Electrical Predistortion to Compensate for Combined Effect of Laser Chirp and Fibre Dispersion", Electronics Letters IEE Stevenage vol. 27, No. 5, Feb. 1991.
A. Mecozzi et al. "Cancellation of timing and Amplitude Jitter in Symmetric Links Using Highly Dispersed Pulses", IEEE Photonics Technology Letters, vol. 13, No. 5, May 2001.
Ram Sadhwani, Adaptive CMOS Predistortion Linearizer for Fiber-Optic Links, Journal of Lightwave Technology, vol. 21, No. 12, Dec. 2003.
P.S. Andre, et al., "Extraction of DFB Laser Rate Equation Parameters for Optical Simulation Pusposes", Conftele 1999 ISBN 972-98115-0-4.
Lucas Illing, et al., "Shaping Current Waveforms for Direct Modulation of Semiconductor Lasers", Institute for Nonlinear Science, U.C. San Diego, 2003.
P.M. Watts, et al., "Demonstration of Electrical Dispersion Compensation of Single Sideband Optical Transmission", London Communications Symposium 2003, University College Lon.
Hoon Kim, et al., "10 Gbit/s 177 km transmission over conventional singlemode fibre using a vestigial side-band modulation format" Electronics Letters, vol. 37, No. 25 Dec. 6, 2001 pp. 1533-1534.
Henning Bulow, et al., "Dispersion Mitigation Using a Fiber-Bragg-Grating Sideband Filter and a Tunable Electronic Equalizer", Optical Society of America, 2000.
M. Sieben, et al., "10Gbit/s optical single sideband system" Electronics Letters, vol. 33, No. 11, May 22, 1997, pp. 971-973.
Feldhaus G., "Volterra Equalizer for Electrical Compensation of Dispersion and Fiber Nonlinearities", Journal of Optical Communicatinos, Fachverlag Schiele & Schon, Berlin, De, vol. 23, No. 3, Jun. 2002 (Jun. 2002), pp. 82-84, XP001130377, ISSN: 0173-4911.

(56) References Cited

OTHER PUBLICATIONS

Schaffer, Troy A. et al "A 2GHz 12-bit Digital-to-Analog Converter for Direct Digital Synthesis Applications", GaAs IC Symposium, pp. 61-64.
Kamoto, T. et al "An 8-bit 2-ns Monolithic DAC", IEEE Journal of Solid-State Circuits, Feb. 1988, vol. 23, No. 1.

* cited by examiner

OPTICAL DISPERSION COMPENSATION IN THE ELECTRICAL DOMAIN IN AN OPTICAL COMMUNICATIONS SYSTEM

CROSS-REFERENCE TO RELATED APPLICATIONS

The present application claims benefit under 35 U.S.C. §363 of International Patent Application No. PTC/CA2003/001044 filed Jul. 11, 2003. The present application is a continuation-in-part of U.S. patent application Ser. No. 10/262,944 (McNicol et al.) entitled "Electrical Domain Compensation of Optical Dispersion in an Optical Communications System" filed on Oct. 3, 2002 now U.S. Pat. No. 7,382,984, the entirety of which is hereby incorporated by reference.

TECHNICAL FIELD

The present invention relates to optical communications systems, and in particular to electrical domain compensation of optical dispersion in an optical communications system.

BACKGROUND OF THE INVENTION

Optical communications systems typically include a pair of network nodes connected by an optical waveguide (i.e., fiber) link. Within each network node, communications signals are converted into electrical signals for signal regeneration and/or routing, and converted into optical signals for transmission through an optical link to another node. The optical link between the network nodes is typically made up of multiple concatenated optical components, including one or more (and possibly 20 or more) optical fiber spans (e.g., of 40-150 km in length) interconnected by optical amplifiers.

The use of concatenated optical components within a link enables improved signal reach (that is, the distance that an optical signal can be conveyed before being reconverted into electrical form for regeneration). Thus, for example, optical signals are progressively attenuated as they propagate through a span, and amplified by an optical amplifier (e.g., an Erbium Doped Fiber Amplifier—EDFA) prior to being launched into the next span. However, signal degradation due to noise and dispersion effects increase as the signal propagates through the fiber. Consequently, noise and dispersion degradation become significant limiting factors of the maximum possible signal reach.

Dispersion, also known as Group Velocity Dispersion or Chromatic Dispersion, in single mode fibre at least, occurs as a result of two mechanisms:
a) Waveguide dispersion—within a single mode fibre, different wavelengths travel along the fibre at different speeds; and
b) Material dispersion—the phase velocity of plane waves in glass varies with wavelength.

For the purposes of the present invention, references to "dispersion" shall be understood to mean the sum total of group velocity dispersion effects.

Mathematically, first order dispersion is the derivative of the time delay of the optical path with respect to wavelength. The effect of dispersion is measured in picoseconds arrival time spread per nanometre line width per kilometer length ($ps \cdot nm^{-1} \cdot km^{-1}$). The magnitude of waveguide and material dispersions both vary with wavelength, and at some wavelengths the two effects act in opposite senses. The amount of dispersion present in a link can also vary with the temperature of the cable, and if the route is changed (e.g., using optical switches). Dispersion in optical fibre presents serious problems when using light sources whose spectrum is non-ideal, for example broad or multispectral-line, or when high data rates are required, e.g., over 2 GB/s.

For the purposes of analyzing the effects of dispersion, it is convenient to represent an optical communications system using the block diagram of FIG. 1. In this case, the transmitter is represented by an electrical-to-optical converter (E/O) 2 which operates to convert an electrical input signal x(t) into a corresponding optical signal $E_{IN}(\omega)$ for transmission to the receiver. The optical fiber span 4, including all concatenated components, is represented by a transfer function $T(\omega)$, which will normally be complex. The Receiver is represented by an optical-to-electrical converter (O/E) 6 which detects the optical signal $E_{OUT}(\omega)$ received through the optical fiber span 4, and generates a corresponding output signal y(t). For a linear optical channel, the received optical signal $E_{OUT}(\omega)$ will nominally be equivalent to the product of $E_{IN}(\omega)$ and $T(\omega)$.

In general, the output signal y(t) represents a distorted version of the input data signal x(t). While it would be highly desirable for $T(\omega) \approx 1$, this is rarely the case. Accordingly, it is frequently necessary to utilize at least some form of compensation, so that the original input data signal x(t) can be detected within the distorted output signal y(t).

One commonly used method of addressing the problem of dispersion in high-bandwidth communications systems is by inserting one or more optical dispersion compensators 8, represented in FIG. 1b by the compensation function $C(\omega)$, within the link. Such dispersion compensators may, for example, take the form of a length of fibre, a Mach Zehnder interferometer, an optical resonator, or a Bragg reflector. Some of these compensators can also produce a controllable amount of compensation, which enables mitigation of time-variant dispersion effects. In either case, these compensators are intended to at least partially offset the signal distortions introduced by the system transfer function $T(\omega)$. The compensation function $C(\omega)$ is a dispersive function that is selected to optimize performance of the link. In a fully linear system, the compensation function $C(\omega)$ would preferably be equivalent to the complex conjugate $T^*(\omega)$ of the transfer function $T(\omega)$, in which case $T(\omega) \cdot C(\omega) = 1$, and the combined effect of $T(\omega)$ and $C(\omega) = T^*(\omega)$ would be an undistorted received signal $E_{OUT}(\omega)$ that exactly corresponds to the original optical signal $E_{IN}(\omega)$. However, limitations of optical components, and the time-varying amount of compensation required, make this objective very difficult to achieve. Additionally, optical compensators are expensive and introduce significant optical losses. These losses must be offset by additional optical gain which introduces more optical noise. The additional (or higher-performance) optical amplifiers required to provide this increased gain further increases the total cost of the communications system. In addition, the presence of optical dispersion compensators and high performance amplifiers distributed along the length of the link provides a significant technical barrier to system evolution. For example, implementation of optical switching (e.g. at the Tx and/or Rx ends of the link, or an intermediate site without electrical termination) necessarily requires adjustment of optical amplifiers, in order to accommodate changing energy states within the link.

These problems can be alleviated by moving the compensation function to the terminal ends (e.g., the transmitter 2 and/or receiver 6) of the link. This technique typically involves "preprocessing" the input signal x(t) at the transmitter (Tx) end of the link 4 to improve dispersion tolerance, and/or postprocessing the output signal y(t) detected at the receiver (Rx) end of the link to accurately detect the input signal x(t) within the distorted output signal y(t).

For example, high bandwidth traffic can be distributed over a larger number of lower-rate channels. The reduced bit-rate of each channel enhances the dispersion tolerance in proportion to the square of the reduction in the bit-rate. However, this approach is expensive, spectrally inefficient, and creates four wave mixing problems.

The publication "*Dispersion Compensation by Active Predistorted Signal Synthesis*" Koch et al, Journal of Lightwave Tech, Vol. LT-3, No. 4, August 1985, pp. 800-805, describes a technique for synthesizing a predistorted optical signal at the input end of the optical link. According to Koch et al, an (electrical) input signal is used to drive a set of N parallel optical modulators. Each of the parallel optical signals is subject to a respective predetermined delay, and the delayed signals optically combined to produce a predistorted optical signal. Dispersion of the optical link then processes the predistorted optical signal to generate a substantially undistorted optical signal at the receiver end of the link. This approach uses multiple parallel optical modulators, optical delays and a signal combiner to produce an approximation of the desired "ideal" predistorted optical signal. The accuracy of this approximation can be increased by increasing the number (N) of modulators. However, this solution dramatically increases the cost of the system. In addition, in order to compensate time-varying dispersion, it is necessary to individually control each of the optical modulators and the respective signal delays. This requirement can significantly increase the size and complexity of the control system.

Koch et al speculate (at page 801) that it might be possible to synthesize a predistorted waveform using " . . . an algorithm at the input which involves all the neighboring bits of information over a time span on the order of that to which dispersion broadens the sharpest features in the absence of any compensation." However, Koch et al do not provide any teaching regarding how this might be accomplished, and in fact conclude that this solution would be " . . . difficult to realize, and in general also requires modulation bandwidths fully capable of transporting the undistorted signal." Accordingly, Koch et al reject this approach in favor of their technique of combining multiple delayed optical signals.

Dispersion tolerance can be increased by narrowing the spectrum of the transmitted optical signal. Various known techniques may be used for this purpose, such as multilevel coding. However, this requires expensive electronics and significantly reduces the noise tolerance of the communications system.

Subcarrier multiplexing, which involves transmitting a plurality of lower bit-rate signals over one optical carrier, is another known method of increasing dispersion tolerance. In this case, the dispersion tolerance obtained is equivalent to that of the lower bit-rate subcarrier. However this approach is not cost effective and does not have a good noise tolerance.

The optical spectrum occupied by a signal can be reduced by use of modulators with reduced chirp, such as a Mach-Zehnder modulator. The amount of chirp can even be tailored to optimize transmission over a particular moderate amount of dispersion. One variation of this technique is referred to as dispersion supported transmission, an example of which is discussed in EP-A-0643 497. In this case, dispersion produces an FM to AM conversion effect, which can facilitate bit detection and thereby extend transmission distance without controlling or compensating dispersion. The dispersion causes shifting of adjacent signal components of different wavelengths, resulting in either energy voids or energy overlaps at the bit transitions. Constructive interference in an overlap causes a positive peak in the optical signal, while a void produces a negative peak. In principle, these positive and negative peaks represent an AM signal which may be detected to reproduce the original bit stream. This has proved difficult to implement over a reasonable range of practical link dispersions.

Many transmission formats are known that enable somewhat increased dispersion tolerance, for example, as described in U.S. Pat. No. 5,892,858. However none of these formats provide sufficient dispersion tolerance to allow a wide bandwidth signal to be accurately detected in the presence of large amounts of dispersion.

It is known that the use of a coherent receiver enables the signal degradation due to dispersion to be removed via linear electrical filtering. However, because of their high cost, very few coherent optical receivers have been installed, and the cost of replacing installed receivers with the high-performance coherent receivers is prohibitive.

The majority of receivers installed in modern optical communications networks are of the direct detection type. Due to the well known squaring effect in these receivers, electrical processing of the output signal y(t) is capable of compensating only a very limited amount of dispersion. See, for example, "*Performance of Smart Lightwave Receivers with Linear Equalization*" Cartledge et al, J Lightwave Tech, Vol. 10, No. 8, August 1992, pp. 1105-1109; and "*Electrical Signal Processing Techniques in Long-Haul Fiber-Optic Systems*" Winters et al, IEEE Trans. Comms, Vol. 38, No. 9, September 1990, pp. 1439-1453}.

In addition to the squaring effect in conventional receivers, optical modulators also frequently display a non-linear performance characteristic. Nonlinearity compensation of modulators can be implemented in the electrical domain (see, for example "*Reduction of Dispersion-Induced Distortion in SCM Transmission Systems by using Predistortion-Linearized MQW-EA Modulators*", Iwai et al, Journal of Lightwave Tech., Vol. 15, No. 2, February 1997, pp. 169-177). It is also possible to provide the nonlinear compensation in the optical domain (see "*Mitigation of Dispersion-Induced Effects using SOA in Analog Optical Transmission*", Jeon et al, IEEE Photonics Technology Letters, Vol. 14, No 8, August 2002, pp. 1166-1168 and "*Predistortion Techniques for Linearization of External Modulators*", Wilson, 1999 Digest of the LEOS Summer Topical Meetings, 1999, pp. IV39-IV40), or via hybrid optical/electrical domains (see, for example "*Signal Distortion and Noise in AM-SCM Transmission Systems employing the Feedforward Linearized MQW-EA External Modulator*", Iwai et al, Journal of Lightwave Tech., Vol. 13, No. 8, August 1995, pp. 1606-1612 and U.S. Pat. No. 5,148,503).

While modulator non-linearity can be compensated, the output signal y(t) detected at the Rx end of the communications system contains distortion components due to non-linearities in both the modulator (transmitter) 2 and the receiver 6, as well due to optical dispersion within the link 4. These distortions are compounded, one upon the other, and it is difficult to distinguish distortions of the output signal y(t) due to non-linearity of the modulator 2 from those resulting from non-linearity of the receiver 6. It is also difficult to distinguish these effects from dispersion.

Accordingly, a cost-effective technique for mitigating the effects of dispersion on high bandwidth optical signals remains highly desirable.

SUMMARY OF THE INVENTION

Accordingly, an object of the present invention is to provide a technique for mitigating effects of dispersion on high bandwidth optical signals in an optical communications system.

This object is met by the combination of elements defined in the appended independent claims. Option elements of the invention are defined in the dependent claims.

Thus an aspect of the present invention provides a method of compensating optical dispersion of a communications signal conveyed through an optical communications system. A compensation function is determined that substantially mitigates the chromatic dispersion imparted to the communications signal by the optical communications system. The communications signal is them modulated in the electrical domain using the compensation function.

The method of the invention can be implemented at either the Tx or Rx ends of the communications system, or may be divided between both ends, as desired. In cases where the method of the invention is implemented in the transmitter, the communication signal in the form of an input electrical signal (e.g. a substantially undistorted binary signal) is digitally filtered using the compensation function to generate a predistorted signal. The predistorted signal is then used to modulate an optical source to generate a corresponding predistorted optical signal for transmission through the optical communications system. This arrangement is particularly advantageous, because the predistorted signal can incorporate compensation for dispersion and component non-linearities throughout the system. Consequently, dispersion compensation can be effectively implemented independently of the type of detection (i.e. direct or coherent) used in the receiver.

In cases where the method of the invention is implemented in the receiver, the received optical signal is converted into a corresponding received electrical signal, which includes distortions due to dispersion imparted on the optical signal by the optical communications system. The received electrical signal is then sampled (e.g. using an analog-to-digital converter) and digitally filtered using the compensation function to generate an output electrical signal which is a substantially undistorted version of the original communications signal.

Thus the present invention compensates optical dispersion by digitally filtering a communications signal in the electrical domain. This filtering of the communications signal is governed in accordance with the required compensation function of the communications system transfer function and the non-linearity compensation required. With this arrangement, arbitrary optical dispersion imparted by the communications system can be compensated in such a manner that a comparatively undistorted output signal is generated at the receiving end of the communications system.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

Figure 1A:
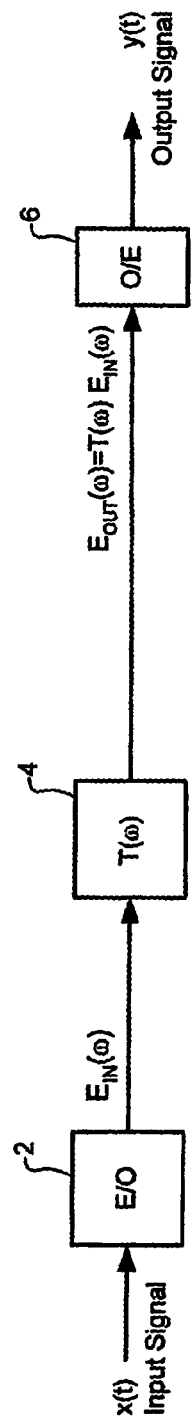
FIGS. 1a and 1b are block diagrams schematically illustrating transmission of an input data signal through a conventional optical communications system.
Figure 1B:
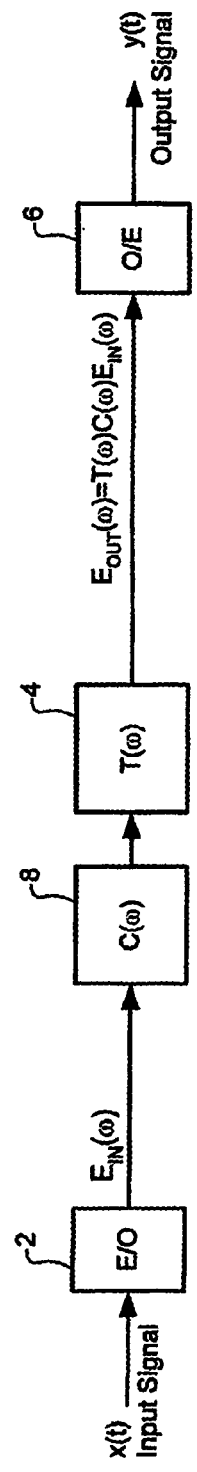
Figure 2:
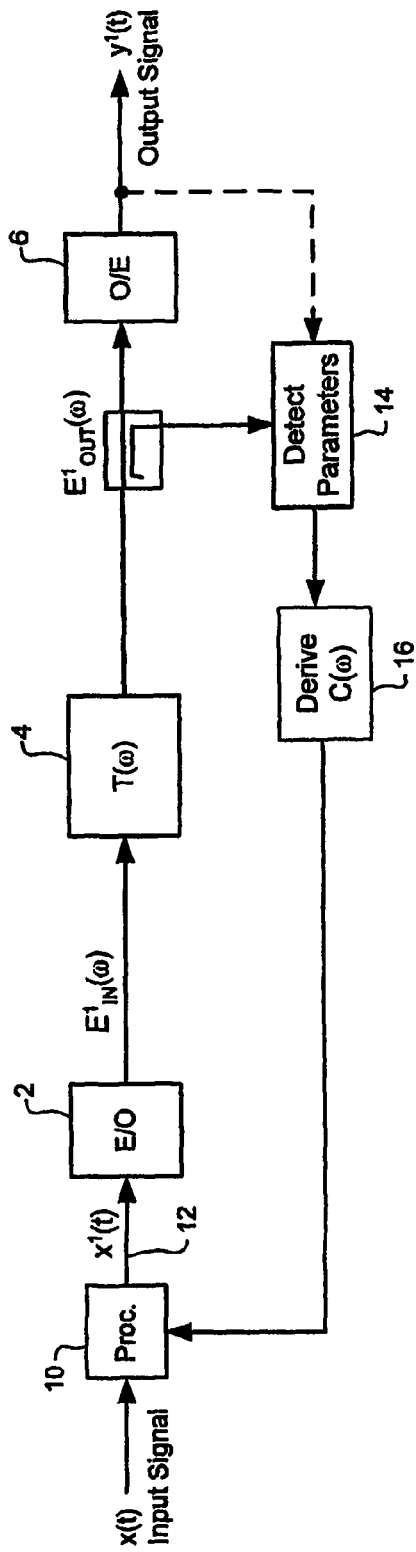
FIG. 2 is a block diagram schematically illustrating transmission of an input signal through an optical communications system in accordance with an embodiment of the present invention.

The present invention provides a method and system for compensation of chromatic dispersion in an optical communications system. FIG. 2 is a block diagram schematically illustrating principal operations in accordance with the method of the present invention.

As shown in FIG. 2, the optical communications system is represented by electrical-to-optical (E/O) and optical-to-electrical (O/E) converters 2 and 6 separated by an optical link 4 represented by a system transfer function $T(\omega)$. In accordance with the present invention, signal distortions introduced by the system transfer function $T(\omega)$ are compensated by deriving a compensation function $C(\omega)$ that optimizes system performance. A compensation processor 10 uses the compensation function $C(\omega)$ to filter the input signal x(t) in the electrical domain, thereby producing a predistorted input signal $x^1(t)$ 12 given by:

$$x^1(t) = x(t) \text{ conv } C(\omega)$$

where "conv" is the convolution function.

The predistorted input signal $x^1(t)$ 12 is then converted to a corresponding predistorted optical signal $E^1{}_{IN}(\omega)$ by the E/O converter 2 and transmitted through the optical link 4 to the receiver. Within the receiver, the incoming optical signal $E^1{}_{OUT}(\omega)$ is converted by the O/E converter 6 into a corresponding output signal $y^1(t)$. As may be seen in FIG. 2, the received optical signal $E^1{}_{OUT}(\omega)$ is the predistorted optical signal $E^1{}_{IN}(\omega)$ multiplied by the transfer function $T(\omega)$ of the optical communications system. When the distortions introduced by the compensation function $C(\omega)$ exactly counterbalance those introduced by the system transfer function $T(\omega)$, the output signal $y^1(t)$ generated by the O/E converter 6 will be a substantially undistorted version of the original input data signal x(t). Thus the present invention provides a technique of compensating optical distortions impressed upon optical signals traversing the optical link 4, by predistorting the input data signal x(t) in the electrical domain at the transmitting end of the optical link 4. Because dispersion compensation is accomplished in the electrical domain, a substantially arbitrary compensation function C(ω) can be implemented, thereby facilitating effective compensation of even severe optical dispersion.

Various methods may be used to derive the compensation function C(ω). In the example of FIG. 2, the optical signal $E^1_{OUT}(\omega)$ at or near the O/E converter 6 is monitored (at 14), in order to detect signal quality parameters indicative of dispersion in the optical communications system. In preferred embodiments, the signal quality parameters comprise a direct measurement of dispersion as a function of wavelength across the wavelength band of interest. However, other signal quality parameters such as, for example, the bit error rate or eye closure may be used as proxies for the dispersion. Any of the signal quality parameters may be detected based on an optical signal obtained by tapping the optical link 4 (as shown by solid lines in FIG. 2), or alternatively by analysis of the output signal y(t) generated by the E/O converter 6 (as shown by the dashed line in FIG. 2). In either case, a compensation function C(ω) which optimizes the detected parameters can then be derived (at 16) deterministically and/or adaptively, using known techniques.

It should be noted that the functional step of deriving the compensation function C(ω) can be implemented by any suitable combination of hardware and software, which may be co-located with the receiver, the transmitter, or any other location. In embodiments in which the detected parameters comprise direct measurement of dispersion, the compensation function C(ω) can be derived to minimize (and preferably eliminate) the total dispersion. Where bit error rate and/or eye closure are used as proxies, then the compensation function C(ω) would be derived to optimize these values.

Figure 3:
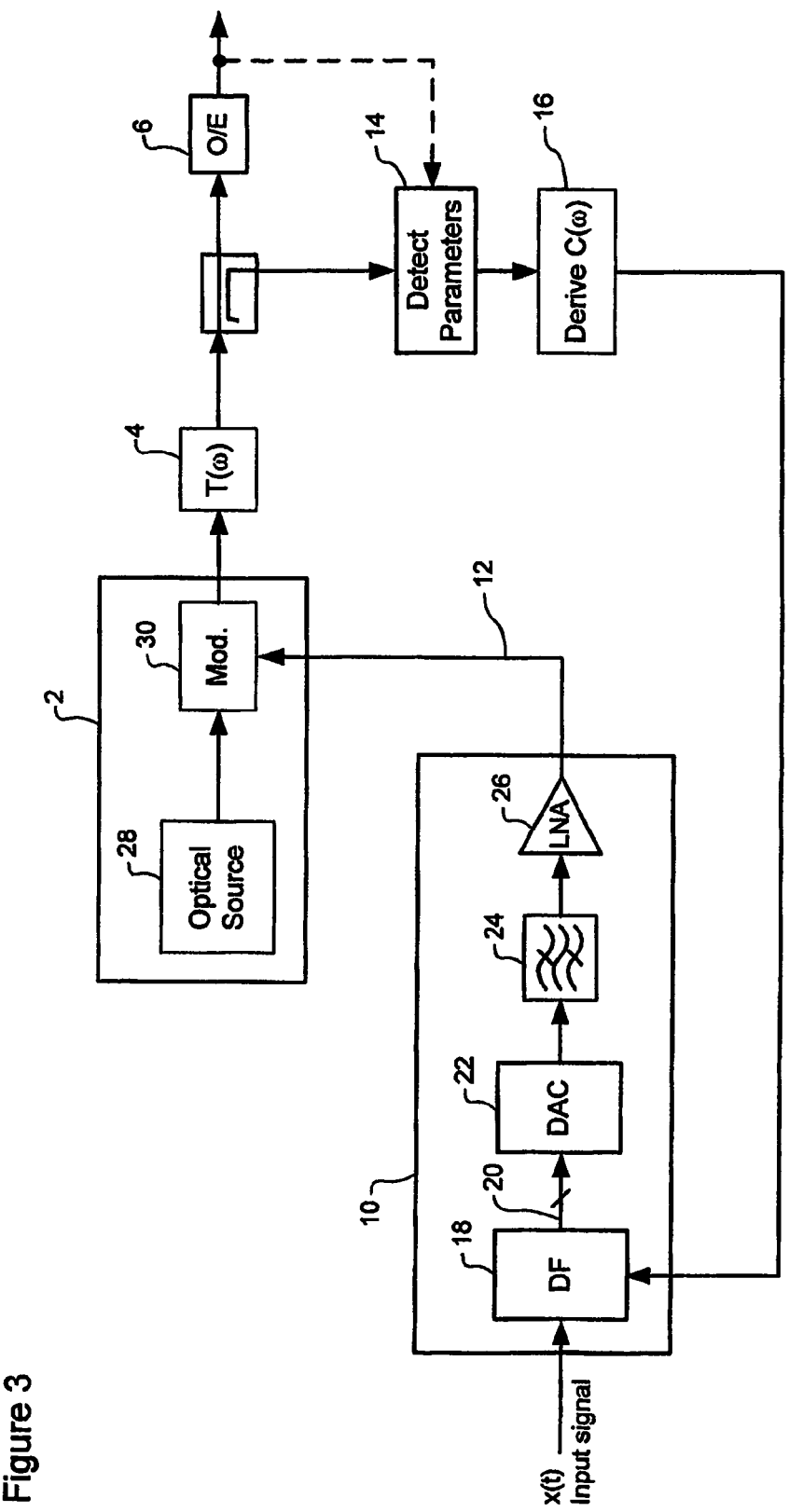
FIG. 3 is a block diagram schematically illustrating principal components and operations of a compensation processor in accordance with a first embodiment of the present invention.

FIG. 3 is a block diagram schematically illustrating principal elements and operations of a compensation processor 10, in accordance with a first embodiment of the present invention. As shown in FIG. 3, the input signal x(t) is filtered by a digital filter 18 which accepts the compensation function C(ω) as an input. Various known digital filter types may be used to implement the digital filter 18, such as, for example, Finite Impulse Response (FIR) filters, Infinite Impulse Response (IIR) filters, and Fast Fourier Transform (FFT) filters). Alternatively, the digital filter 18 may be implemented using a Random Access Memory Look-up Table (RAM LUT), as will be described in greater detail below with reference to FIGS. 4-7. In either case, the digital filter 18 generates successive sample values 20 of the predistorted signal $x^1(t)$ 12, at a sample rate which is about double the bit-rate of the input signal. A high-speed digital to analog converter (DAC) 22 can then be used to convert these sample values 20 into an analog predistorted signal $x^1(t)$ 12. If desired, the analog predistorted signal $x^1(t)$ 12 can be conditioned, for example by means of a filter 24 and a low noise amplifier (LNA) 26, in a conventional manner, to remove out-of-band noise and to scale the amplitude of the analog signal to the dynamic range of the E/O converter 2. In the illustrated embodiment, the E/O converter 2 comprises a tuned optical source 28 such as a narrow band laser coupled to a conventional optical modulator 30. In this case, the analog predistorted signal $x^1(t)$ 12 can be used as an input to control the optical modulator 30 in a manner known in the art.

Figure 4:
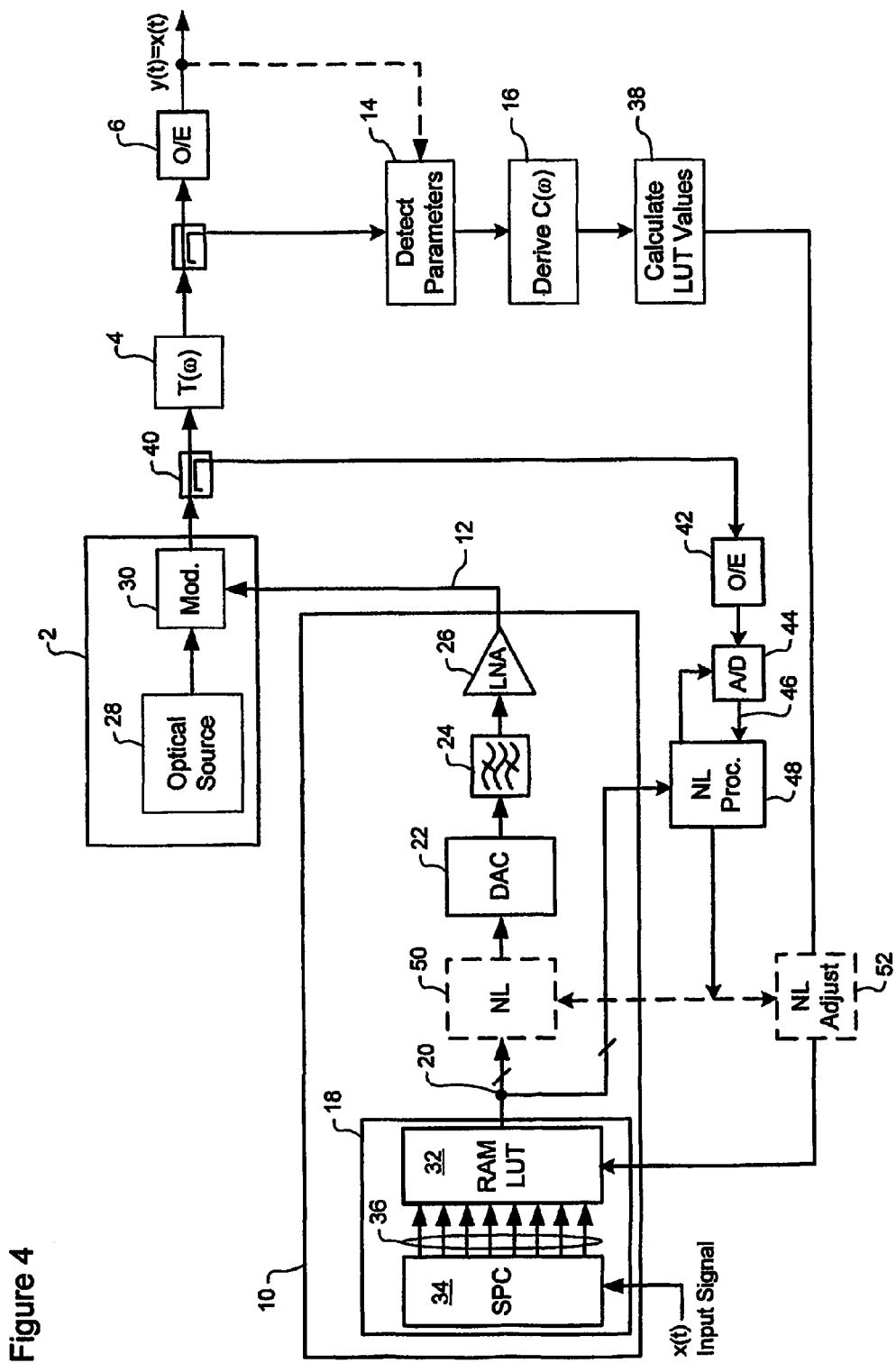
FIG. 4 is a block diagram schematically illustrating principal components and operations of a compensation processor in accordance with a second embodiment of the present invention.

As mentioned above, the digital filter 18 may be implemented in a variety of ways. FIG. 4 schematically illustrates an embodiment in which the digital filter 18 is implemented using a RAM LUT 32. This technique exploits the fact that the input signal x(t) is a substantially undistorted binary signal, in which successive bits can be unambiguously discriminated. This greatly simplifies the problem of digitally filtering the input signal x(t), because a direct relationship can be defined between the input signal x(t) and each sample value 20 of the predistorted signal $x^1(t)$ 12.

As shown in FIG. 4, successive bits of the input signal x(t) are latched through a serial-to-parallel converter (SPC) 34 (e.g., a shift register) which converts the serial bit stream into a parallel bit stream 36 having a width of N bits. In the illustrated embodiment N=8, it being understood that other values of N may be used as desired. Each N-bit word of the parallel data stream 36 is then used as an index value to access a random access memory (RAM) look-up table 32 having $2^N$ registers (not shown). With this arrangement, one or more M-bit (where M will generally be at least four) sample values 20 of the predistorted signal $x^1(t)$ 12 corresponding to each N-bit word can be calculated and stored in each register of the RAM LUT. As each N-bit word of the parallel data stream is latched into the RAM LUT, the corresponding M-bit sample value(s) of the predistorted signal $x^1(t)$ 12 is(are) latched out of the RAM LUT 32. It should be noted that, in order to facilitate accurate synthesis of the predistorted signal $x^1(t)$ 12 at the output of the DAC 22, the Nyquist sampling theorem must be respected. In this case, each register of the RAM LUT 32 will store at least two successive sample values 20 for each N-bit word of the parallel data stream. Because the RAM LUT 32 performs a substantially linear filtering function, it is possible to construct the LUT 32 as a set of two or more Random Access Memory blocks (not shown), if desired. In this case, each RAM block stores a respective portion of the desired numerical valve 20 of the predistorted signal component. Thus the outputs generated from each RAM block can be digitally summed, in a conventional manner, to produce the desired numerical valve 20. This arrangement allows the LUT 32 to be larger than can conveniently be accommodated within a single RAM block.

Various methods may be used to calculate each of the digital values 20 stored in the look-up table 32. In the example of FIG. 4, the compensation function C(ω) (derived at 16) is used to calculate (at 38) respective M-bit sample values for each of the $2^N$ possible N-bit words. Each M-bit sample value can then be stored in the appropriate RAM LUT register indexed by its respective N-bit word.

Because chromatic dispersion causes a time domain distortion of an input signal, the sample value 20 of the predistorted input signal 12 at a particular instant (t) will necessarily be a function of the analog waveform of the input signal x(t) within a time window that brackets the instant in question. The width of the time window, measured in symbols, will generally be a function of the maximum dispersion (D) for which compensation is to be provided; the bandwidth (B) of the optical signal; and the symbol interval (S) of the optical signal. For example, consider an optical communications system in which the transmitter generates an optical signal having a bandwidth of B nanometers and a symbol interval of S picoseconds/symbol. In this case, the maximum dispersion (D) that can be compensated is given by the equation:

$$D = N \cdot \frac{S}{B},$$

where N is the width of the time window, measured in symbols. It will be appreciated that the selected value of N will limit the maximum dispersion (D) that can be effectively compensated. In general, the value of N will be selected based on the expected maximum dispersion of the optical communications system.

In the example of FIGS. 3 and 4, the look-up table 32 uses N=8 successive bits of the input signal x(t) to reference successive sample values 20 of the predistorted signal 12. In this case, the time window used for calculating each sample value of the predistorted signal spans a total of N=8 symbols.

Following the discussion above, it will be seen that each sample value 20 stored in the look-up table 32 can readily be calculated (at 38) by applying the derived compensation function $C(\omega)$ to each one of the $2^N$ possible N-bit words. For each N-bit word, the calculated sample value can then be stored in the look-up table register that is indexed by the N-bit word in question. This process will result in the look-up table 32 being loaded with pre-calculated sample values 20 of the predistorted signal 12 which will be accessed, in sequence, as successive bits of the input signal x(t) are latched through the serial-to-parallel converter 34.

It will generally be advantageous to arrange the RAM LUT 26 to output more than one numerical value 20 of the predistorted signal 12 for each bit of the input signal x(t). This can readily be accomplished by calculating the required numerical values 20 for each N-bit word, and storing the resulting set of numerical values 20 in the appropriate register. As each bit of the input signal x(t) is latched through the serial-to-parallel converter 34; all of the numerical values calculated for each unique N-bit word will be output, in an appropriate sequence, from the RAM LUT 32.

In the foregoing discussion, it was assumed that both the DAC 22 and the optical modulator 30 are fully linear, so that these components do not introduce any distortions beyond those accounted for by the system transfer function $T(\omega)$. Depending on how the system transfer function $T(\omega)$ is defined, this approach may yield satisfactory results. However, it may be desirable to treat the transfer function $T(\omega)$ of the optical fiber span 4 separately from those of the DAC 22 and modulator 30, in which case the compensation function $C(\omega)$ will not account for distortions introduced by these elements.

In many cases, the performance of the various devices forming the signal path between the DAC 22 and modulator 30, (i.e. the DAC 22, filter 24, LNA 26 and modulator 30) are well characterized, and this knowledge can be used to calculate a mapping which adjusts the sample values 20 generated by the RAM LUT 32 to compensate for any non-ideal response of these devices. However, improved performance can be obtained by sampling the optical waveform output from the E/O converter 2, and comparing the instantaneous amplitude of the optical waveform with the corresponding sample value output by the RAM LUT. Thus, as shown in FIG. 4, the optical waveform output from the E/O converter 2 is tapped (at 40), converted into a corresponding electrical signal (at 42), and sampled by an analog-to digital (A/D) converter 44. The digital sample 46 generated by the A/D converter 44 is then supplied to a non-linear processor 48, which also receives sample values 20 of the predistorted signal 12 from the RAM LUT 32. By properly accounting for propagation delays, it is readily possible to match each sample value 20 with its corresponding digital sample 46 from the A/D converter 44. Comparison between these two values (20 and 46) facilitates calculation of a mapping which can be applied to the sample values 20 to compensate any non-ideal response of the entire signal path between (and including) the DAC 22 and the E/O converter 2, and thereby yield a desired waveform of the predistorted optical signal $E^1_{IN}(\omega)$ at the output of the E/O converter 2.

As may be seen in FIG. 4, the mapping calculated by the non-linear processor 48 can be used to drive a non-linear compensator 50 implemented as a second RAM look-up table positioned between the digital filter 18 and the DAC 22. Alternatively, the mapping can be used to adjust (at 52) the M-bit sample values 20 calculated (at 38) using the compensation function $C(\omega)$. In the later case, sample values 20 output from the distal filter 18 will combine compensation for both dispersion of the link 4 and nonlinearities of the DAC 22 and E/O converter 2.

In the embodiments of FIGS. 3 and 4, a single compensation path is provided for generating the predistorted signal $x^1(t)$ 12 based on the input signal x(t). As will be appreciated, such an arrangement is suitable for modulating a single dimension (e.g., either amplitude or phase) of the input signal x(t). Accordingly, the predistorted signal $x^1(t)$ 12 of the embodiments of FIGS. 3 and 4 will comprise an amplitude or phase modulated version of the original input signal x(t). However, the system transfer function $T(\omega)$ of the optical communications system will normally be complex, so that an optical signal traversing the communications system will suffer distortions in both phase and amplitude. This issue is addressed by the embodiments of FIGS. 5-7.

Figure 5:
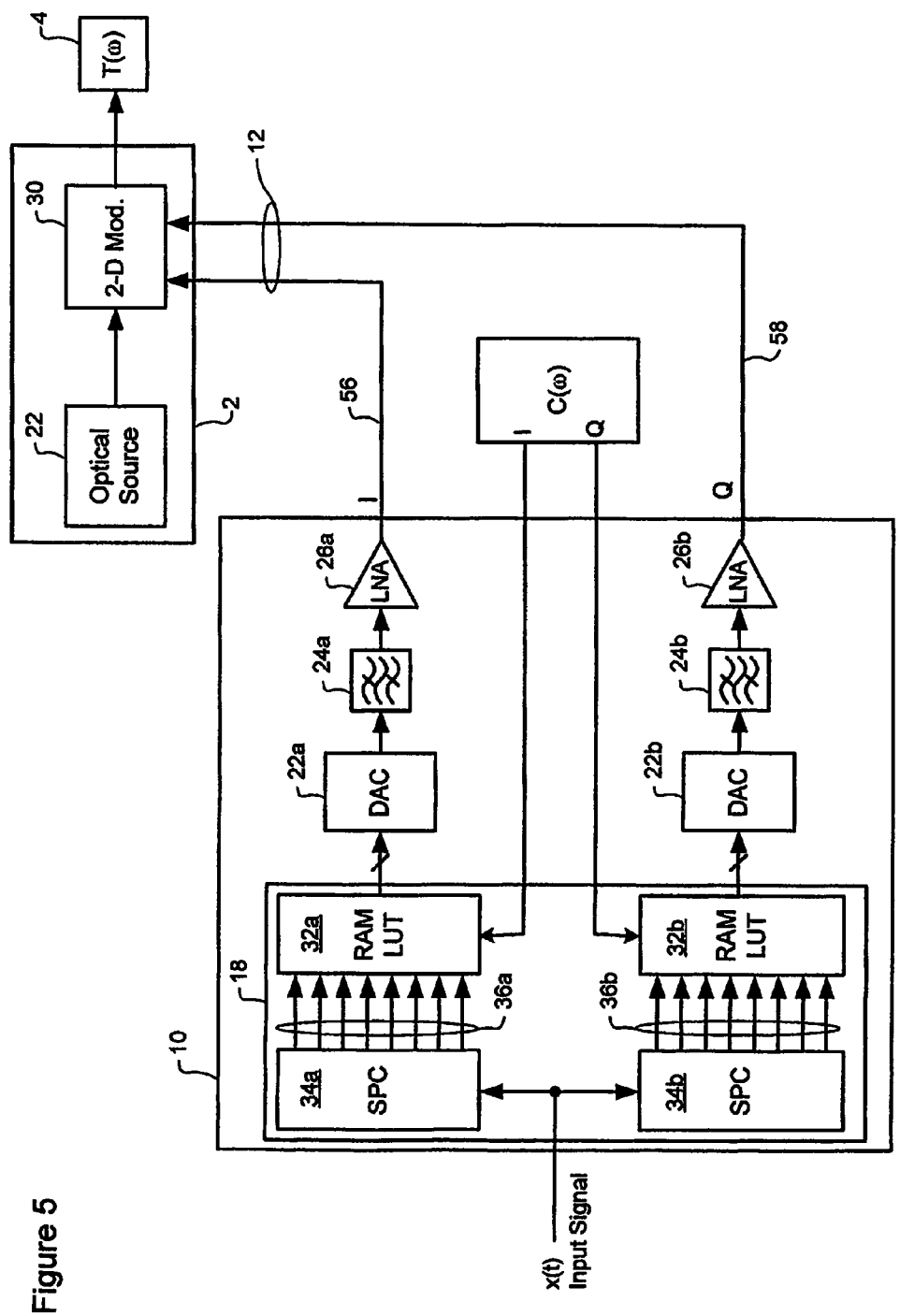
FIG. 5 is a block diagram schematically illustrating principal components and operations of a compensation processor in accordance with a third embodiment of the present invention.

FIG. 5 is a block diagram schematically illustrating an embodiment of the present invention in which a 2-dimensional compensation processor 10 is used to compensate effects of a complex system transfer function $T(\omega)$. In general, the 2-dimensional compensation processor 10 provides an independent compensation path 54 for each dimension of the communications system for which compensation is to be provided. In the embodiment of FIG. 5, it is desired to provide compensation for both amplitude and phase distortions. In this case, a pair of compensation paths 54 generate respective output signals I and Q (at 56 and 58) that represent respective orthogonal (In-phase and Quadrature) components of the predistorted signal 12. The two output signals I and Q are then supplied to a suitable 2-dimensional optical modulator 30 capable of modulating the amplitude and phase of light generated by the optical source 28. Various optical modulators capable of providing this functionality are known in the art, such as, for example, Mach Zehnder modulators.

As will be appreciated, the 2-dimensional compensation processor 10 can be implemented using multiple compensation paths 54 to generate the predistorted signal $x^1(t)$ 12 in any desired format, such as, for example, polar coordinates. The only limitation here is that a suitable optical modulator 30 must be provided for modulating the appropriate optical components in response to the signal components generated by the 2-dimensional compensation processor 10.

Figure 6A:
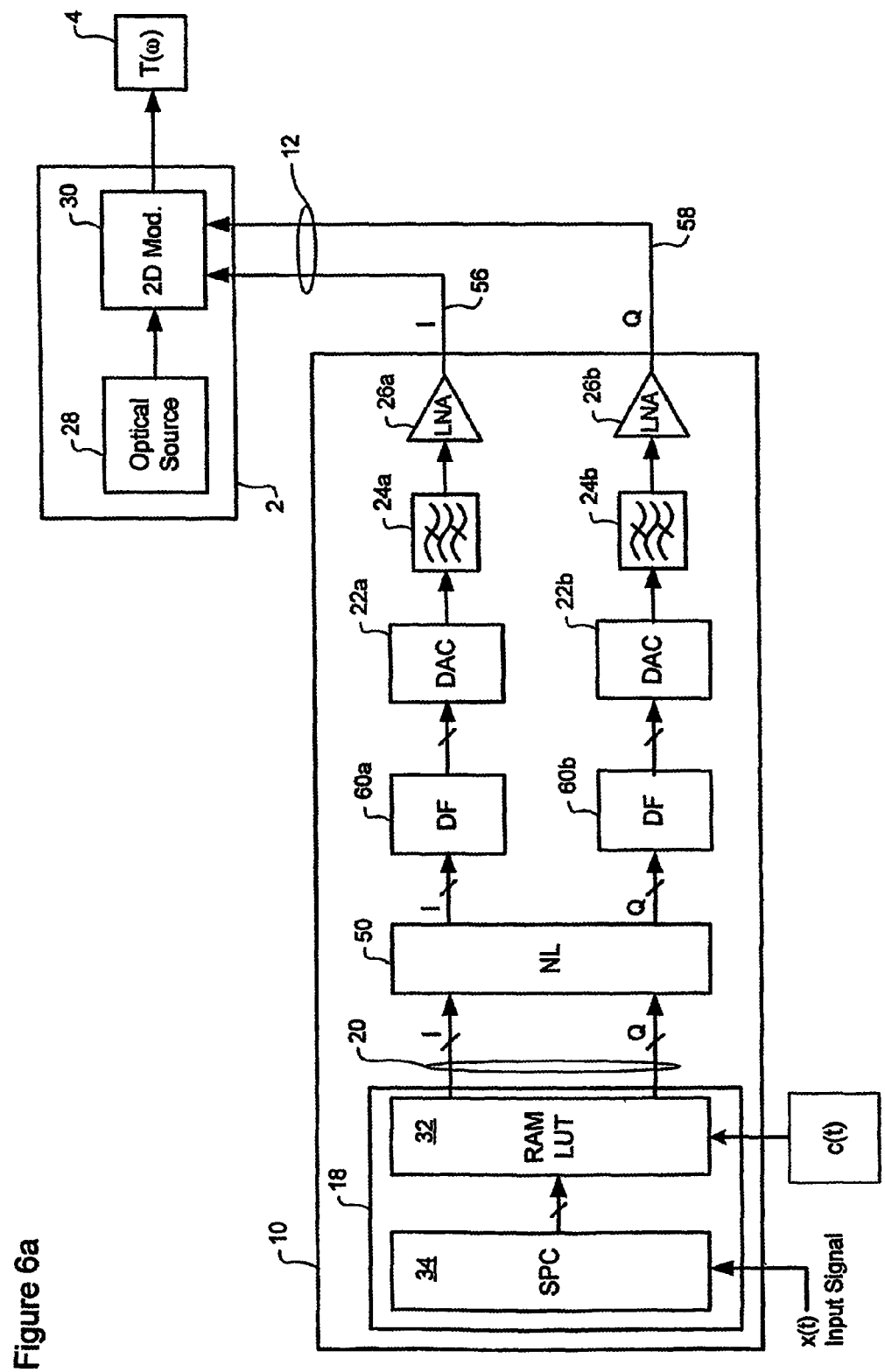
FIGS. 6a and 6b are block diagrams schematically illustrating principal components and operations of a compensation processor in accordance with a fourth embodiment of the present invention.

FIG. 6a is a block diagram illustrating an alternative embodiment of the 2-dimensional compensation processor 10 of FIG. 5. In this case, the pair of parallel N×M RAM LUTs 32 of the digital filter 18 are replaced by a single N×2M look-up table, which outputs parallel M-bit sample values 20a and 20b for each N-bit sequence of the input data x(t). As in the embodiment of FIG. 5, these M-bit sample values 20 represent respective orthogonal (e.g. In-phase and Quadrature) components of the predistorted signal $x^1(t)$ 12. Similarly, other signal formats, such as polar coordinates, may equally be used, provided only that the optical modulator 30 is capable of modulating the appropriate optical components in response to the signals generated by the multi-dimensional compensation processor 10.

Figure 6B:
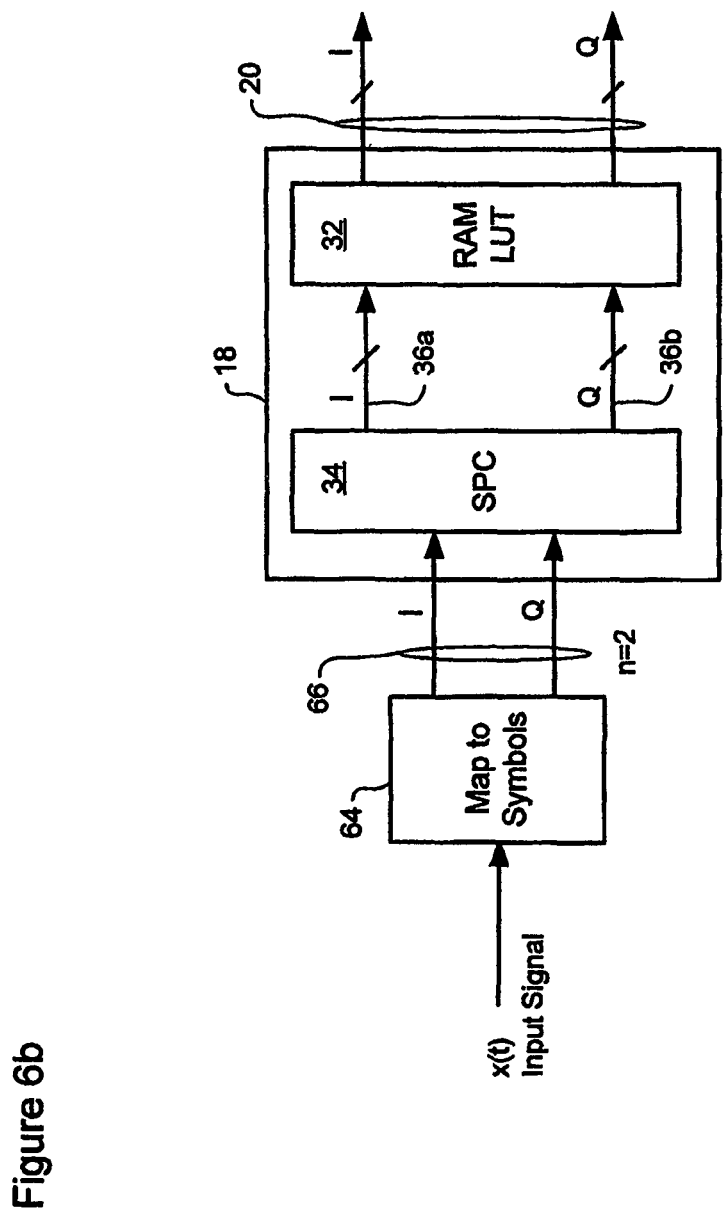

In the embodiment of FIGS. 4-6, the input signal x(t) is supplied directly to the SPC 34, which converts the serial bit stream x(t) into successive N-bit words of the parallel data stream 36. In some cases, however, it may be desirable to provide a converter 64 to map the serial bit stream x(t) into n-bit symbols 66 upstream of the SPC 34, as shown in FIG. 6b. This arrangement would be particularly suitable for Quadrature Phase Shift Keying (QPSK) encoded traffic, for example. In such cases, the SPC 34 will operate to convert each bit of the n-bit symbol stream 66 into successive N-bit words of a corresponding parallel data stream 36. The values stored in each register of the RAM _LUT are calculated to implement a complex filtering operation to output appropriate parallel M-bit sample values 20a and 20b of the predistorted signal 12.

Due to various factors (such as, for example imperfections, or electrical cross-talk) the orthogonal (i.e. In-phase and Quadrature) control signals 56, 58 may in fact produce a non-orthogonal response in the E/O converter 2. Accordingly, in the embodiment of FIG. 6 the non-linear compensator 50 is provided as a single 2M×2M RAM LUT, instead of separate devices for each compensation path 54. Each of the $2^{2M}$ registers of the non-linear compensator 50 stores previously calculated output numerical values for both control signals 56, 58. These output numerical values may be calculated in accordance with a mapping function derived from the combined lightwave emerging from the E/O converter 2, as described above with reference to FIG. 4. With this arrangement, the non-linear compensator 50 can readily implement a 2-D mapping which adjusts both components of the predistorted signal 12 in a complementary manner, to thereby compensate for any non-orthogonal response of the E/O converter 2. As mentioned above, the non-linear compensator 50 may be implemented as a separate device (from the RAM LUT 32), or may be "embedded within the RAM LUT 32" by applying the mapping function to adjust the sample values stored in the RAM LUT 32.

As may be appreciated, in order to successfully compensate dispersion of the link 4, it is important to maintain precise alignment between each of the signal components 56, 58 of the predistorted signal $x^1(t)$ 12 supplied to the optical modulator 30. However, the effects of independent DACs 22, filters 24 and LNAs 26 for each signal component may cause differential propagation delays between the non-linear compensator 50 and the optical modulator 30. Such differential delay can be compensated by means of a digital filter 60 located in at least one of the signal paths. In general, for an n-dimensional compensation processor 10 (i.e. generating n signal components of the predistorted signal 12) differential propagation delays can be compensated by providing a respective digital filter 60 in at least (n−1) compensation paths 54. For convenience, it may be desirable to provide a digital filter 60 in all of the signal paths 54, as illustrated in FIG. 6. In any event, each digital filter 60 can be controlled in a known manner to impose an selected delay, which is calculated to compensate for the differential propagation delays experienced by each of the signal components.

Figure 7A:
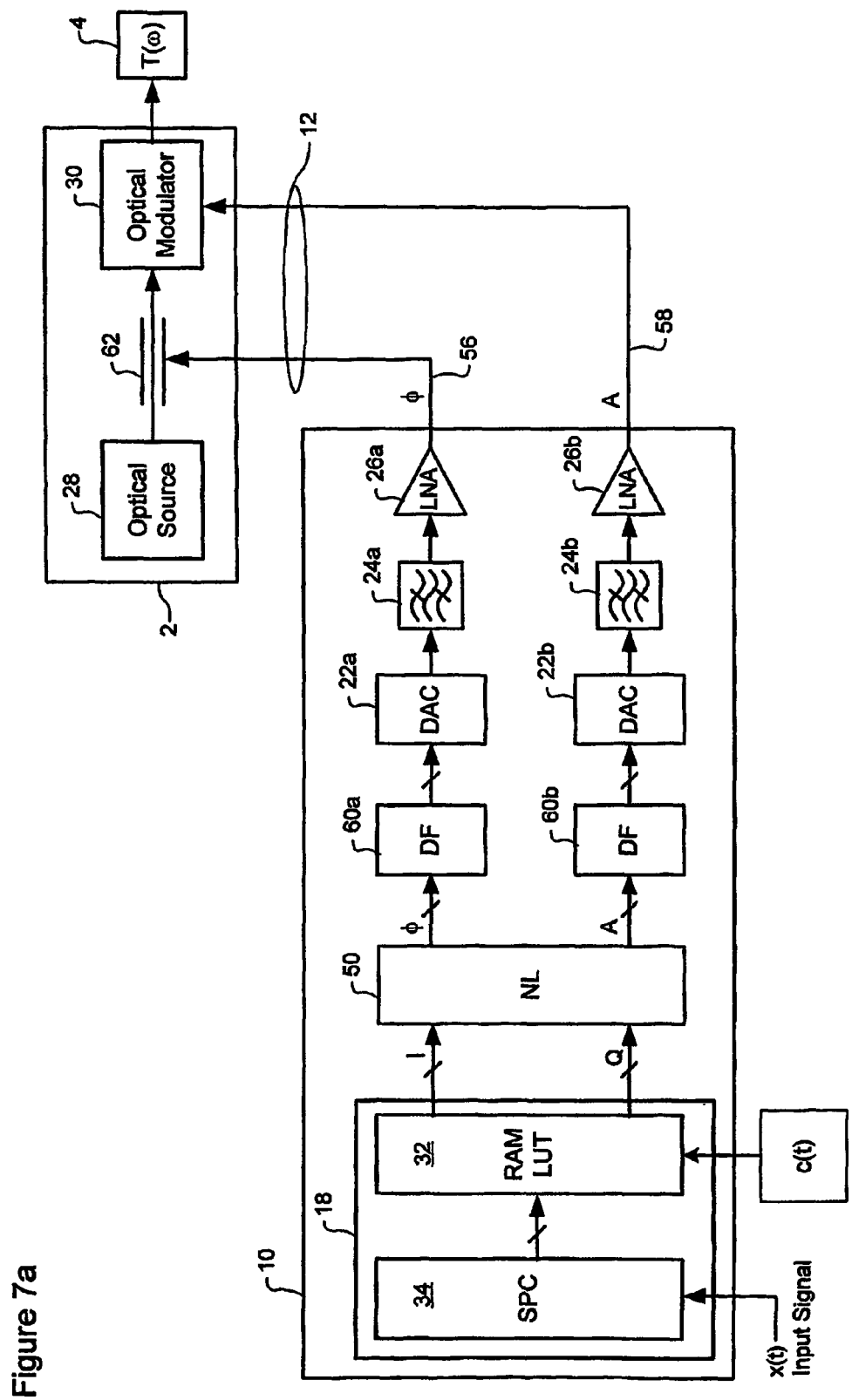
FIGS. 7a and 7b are block diagrams schematically illustrating principal components and operations of a compensation processor in accordance with a fifth embodiment of the present invention.

If desired, the non-linear compensator 50 can also be used to implement a mapping between different signal formats. For example, in the embodiment of FIG. 7, the digital filter 18 is designed to generate the predistorted signal $x^1(t)$ 12 in the form of In-phase and Quadrature components. In addition to compensating non-ideal response of the signal paths between the DACs 22 and the E/O converter 2, the 2M×2M mapping implemented in the non-linear compensator 50 may also be used to convert these I and Q signal components into a corresponding pair of Amplitude and Phase component samples (i.e. following a polar coordinate system), as shown in FIG. 7a. Subsequent digital-to-analog conversion of the phase sample by the DAC 22 yields a phase control signal 56 which can be used to drive a conventional phase shifter 62 to modulate the phase of the optical signal. The amplitude of the optical signal can then be controlled using a conventional optical modulator (such as an electroabsorptive modulator (EAM) or a variable optical attenuator) in accordance with the amplitude control signal component 58.

Figure 7B:
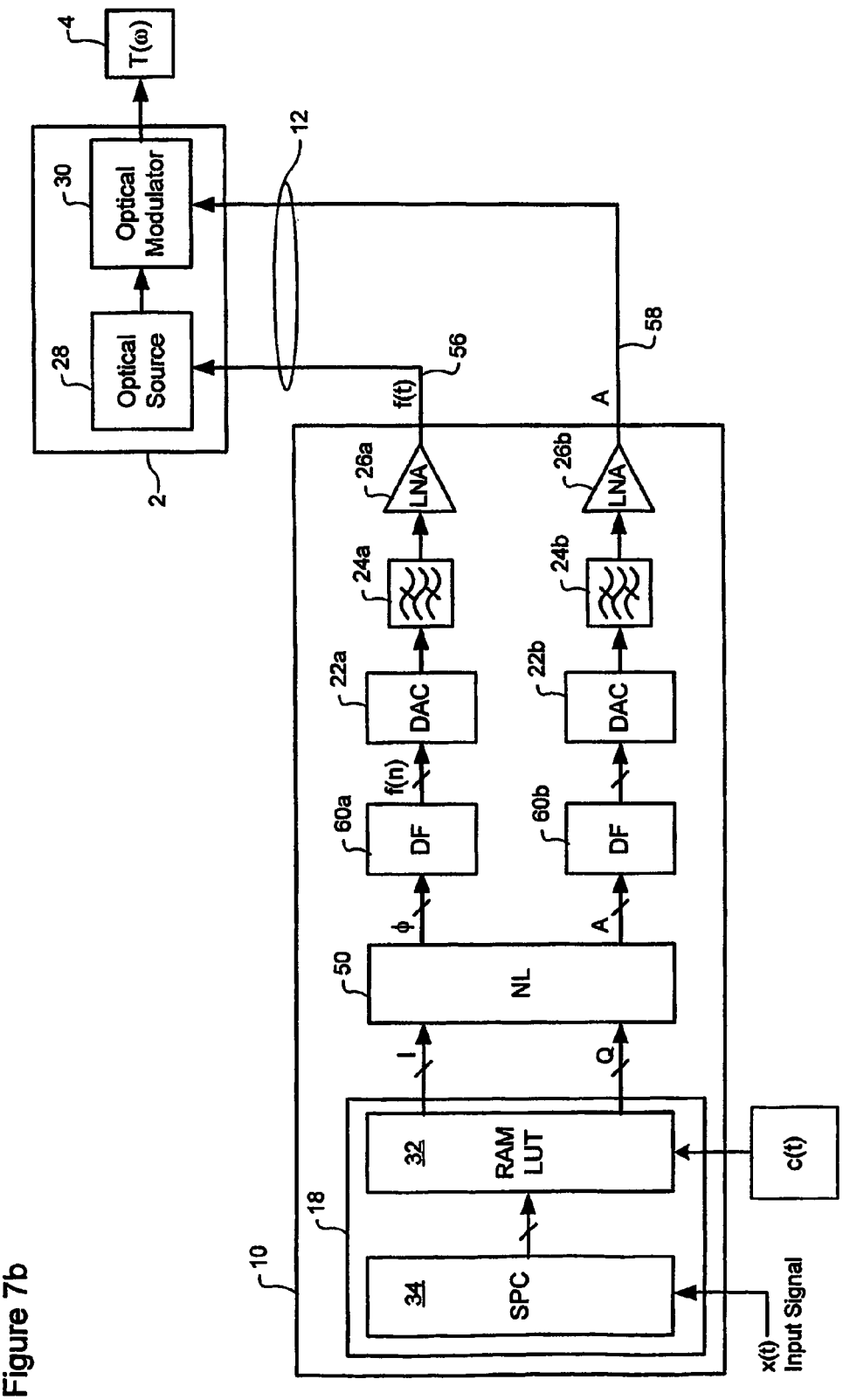

As shown in FIG. 7b, the digital filter 60 can be controlled to calculate the time derivative of the phase component, to yield a frequency sample f(n). In embodiments in which the non-linear compensator 50 is incorporated into the RAM LUT 32, the digital filter 18 can generate the predistorted signal $x^1(t)$ 12 in the form of Amplitude and frequency components directly. In either case, subsequent digital-to-analog conversion of the frequency sample f(n) by the DAC 22 yields a frequency control signal f(t) 56 which can be used to drive the optical source 28 directly. This operation exploits the known characteristic of many narrow-band lasers, which exhibit a frequency dependence on the input current. Accordingly, within a certain range, the frequency of the optical signal emitted by the optical source 28 can be controlled by varying the input current. Here again, the amplitude of the optical signal can be controlled using a conventional optical modulator (such as an electroabsorptive modulator (EAM) or a variable optical attenuator) in accordance with the amplitude control signal component 58.

The embodiment(s) of the invention described above is(are) intended to be exemplary only. The scope of the invention is therefore intended to be limited solely by the scope of the appended claims.

The invention claimed is:

1. A method of compensating dispersion of a communications signal conveyed through an optical communications system, the method comprising steps of:
   deriving a compensation function that substantially mitigates the dispersion imparted to the communications signal by the optical communications system;
   digitally processing an electrical input signal using the compensation function to generate a predistorted electrical signal comprising a pair of orthogonal signal components; and
   independently modulating a phase of an optical signal using a first one of the pair of orthogonal signal components of the predistorted electrical signal and an amplitude of the optical signal using a second one of the pair of orthogonal signal components of the predistorted electrical signal to generate a corresponding predistorted optical signal for tansmission through the optical communications system.

2. The method as claimed in claim 1, wherein the step of determining a compensation function comprises steps of:
   measuring a performance parameter related to the optical dispersion; and
   calculating respective values of one or more parameters of the compensation function that optimizes the measured performance parameter.

3. A method as claimed in claim 2, wherein the step of measuring the performance parameter comprises a step of measuring any one or more of:
   net chromatic dispersion at one or more wavelengths;
   a bit error rate;
   a signal-to-noise ratio; and
   an eye-opening ratio.

4. A method as claimed in claim 2, wherein the step of measuring the performance parameter comprises steps of:
   sampling the optical signal received through the optical communications system; and
   calculating an error function indicative of a difference between the sampled optical signal and a predetermined reference.

5. A method as claimed in claim 1, wherein the step of processing the electrical input signal comprises a step of digitally filtering the electrical input signal using any one of:
   a Fast Fourier Transform (FFT) filter;
   a Finite Impulse Response (FIR) filter; and
   a Infinite Impulse Response (IIR) filter.

6. A method as claimed in claim 1, wherein the step of processing the electrical input signal comprises steps of:
   calculating successive digital sample values of the predistorted signal, based on the electrical input signal and the compensation function; and
   converting each successive sample value into a corresponding analog level of the predistorted electrical signal.

7. A method as claimed in claim 6, wherein the step of calculating successive digital sample values comprises a step of calculating successive corresponding sample values of each signal component.

8. A method as claimed in claim 6, wherein the electrical input signal comprises a substantially undistorted binary signal, and wherein the step of calculating successive digital sample values of the predistorted electrical signal comprises steps of:
   mapping the binary signal to a corresponding stream of n-bit symbols.
   calculating a plurality of successive sample values of the predistorted electrical signal using the stream of n-bit symbols.

9. A method as claimed in claim 8, wherein the step of calculating a plurality of successive sample values of the predistorted electrical signal comprises steps of:
   converting the electrical input signal into a series of N-bit words;
   using each N-bit word as an index value to access a respective register of the look-up table; and
   latching each sample value stored in the accessed register out of the look-up table.

10. The method as claimed in claim 6, wherein the step of calculating successive digital sample values comprises a further step of digitally filtering the orthogonal signal components to compensate at least a differential delay.

11. A method as claimed in claim 7, wherein the orthogonal signal components comprise any one of:
   In-phase and Quadrature signal components;
   Amplitude and Phase signal components; and
   Amplitude and frequency signal components.

12. A dispersion compensation system for compensating optical dispersion of a communications signal conveyed through an optical communications system, the dispersion compensation system comprising:
   derivation means for deriving a compensation function that substantially mitigates the dispersion imparted to the communications signal by the optical communications system;
   a compensation processor for processing an electrical input signal using the compensation function to generate a predistorted electrical signal comprising two parallel orthogonal signal componenets; and
   modulating means for independently modulating a phase of an optical signal using a first obe of the pair of orthogonal signal components of the predistorted electrical signal and an amplitude of the optical signal using a second one of the pair of orthogonal signal components of the predistoeted electrical signal to generate a predistorted optical signal for transmission through the optical communications system.

13. A system as claimed in claim 12, wherein the derivation means is implemented remote from the compensation processor.

14. A system as claimed in claim 12, wherein the derivation means comprises:
   a detector for measuring a performance parameter related to the optical dispersion; and
   a calculation engine for calculating respective values of one or more parameters of the compensation function that optimizes the measured performance parameter.

15. A system as claimed in claim 14, wherein the detector is configured to measure any one or more of:
   net chromatic dispersion at one or more wavelengths;
   a bit error rate;
   a signal-to-noise ratio; and
   an eye-opening ratio.

16. A system as claimed in claim 14, wherein the detector is configured to:
   sample the optical signal received through the optical communications system; and
   calculate an error function indicative of a difference between the sampled optical signal and a predetermined reference.

17. A system as claimed in claim 12, wherein the compensation processor comprises:
   a digital filter for calculating successive digital sample values of the predistorted electrical signal, based on the electrical input signal and the compensation function; and
   a digital-to-analog converter (DAC) for converting each successive digital sample value into a corresponding analog level of the predistorted electrical signal.

18. A system as claimed in claim 17, wherein the digital filter comprises any one of:
   a Fast Fourier Transform (FFT) filter;
   a Finite Impulse Response (FIR) filter; and
   a Infinite Impulse Response (IIR) filter.

19. A system as claimed in claim 17, wherein the compensation processor further comprises a non-linear compensation means for adjusting each digital sample value of the predistorted electrical signal to compensate a nonlinear performance of at least the modulation means.

20. A system as claimed in claim 19, wherein the non-linear compensation means comprises:
   a non-linear processor for calculating a mapping between each sample value and a corresponding adjusted sample value; and
   a non-linear compensator operatively coupled to an output of the digital filter for applying the mapping to each digital sample value of the predistorted electrical signal.

21. A system as claimed in claim 20, wherein the non-linear compensator comprises a Random Access Memory (RAM) Look-up table (LUT) for outputting an adjusted digital sample value corresponding to each digital sample value of the predistorted electrical signal generated by the digital filter.

22. A system as claimed in claim 19, wherein the digital filter is a Random Access Memory (RAM) Look-up table (LUT) configured to store a plurality of predetermined digital sample values of the predistorted electrical signal, and wherein the non-linear compensation means comprises:
- a non-linear processor for calculating a mapping between each sample value and a corresponding adjusted sample value; and
- means for adjusting each of the predetermined digital sample values stored in the RAM LUT in accordance with the calculated mapping.

23. A system as claimed in claim 12, wherein the orthogonal signal components comprise any one of:
- In-phase and Quadrature signal components;
- Amplitude and Phase signal components; and
- Amplitude and frequency signal components.

24. A system as claimed in claim 12, wherein the compensation processor comprises either one of:
- a respective digital filter for generating each component; and
- a single digital filter configured to substantially simultaneously output a respective digital sample value for each component.

25. A system as claimed in claim 12, further comprising, for each component of the predistorted electrical signal, a respective second digital filter operatively coupled for imposing a predetermined delay.

26. A system as claimed in claim 25, wherein the respective predetermined delay imposed on each component is selected to compensate a differential propagation delay.

27. The system as claimed in claim 12, wherein the electrical input signal comprises a substantially undistorted binary signal and wherein the compensation processor further comprises a mapper for mapping the binary signal into a stream of n-bit symbols.

28. A system as claimed in claim 27, wherein the digital filter comprises:
- a serial-to-parallel converter for converting the stream of n-bits symbols into a series of N-bit words; and
- a Random Access Memory (RAM) Look-up table (LUT) for outputting at least one digital sample value of the predistorted electrical signal corresponding to each N-bit word.

29. A system as claimed in claim 28, wherein the look-up table comprises:
- two or more memory blocks for storing a respective portion of each digital sample value of the predistorted signal; and
- a summation circuit for summing the respective portions of the digital sample value output from each memory block.

30. A system as claimed in claim 12, wherein the modulating means comprises any one or more of:
- a narrowband laser configured to generate the optical signal having a frequency which is controllable in response to an analog current level of the predistorted electrical signal;
- an optical modulator configured to modulate either one or both of an amplitude and phase of the optical signal in response to an analog voltage level of the predistorted electrical signal; and
- a variable optical attenuator configured to modulate an amplitude of the optical signal in response to an analog voltage level of the predistorted electrical signal.

31. A dispersion compensator for compensating optical dispersion of a communications signal conveyed through an optical communications system, the dispersion compensator being implemented in a transmitter of the optical communications system, and comprising:
- a digital filter for calculating successive digital sample values of the predistorted electrical signal comprising a pair of orthogonal signal components, based on the electrical input signal and the compensation function that substantially mitigates the dispersion imparted to the communication signal by the optical communication system ; and
- a respective digital-to-analog converter (DAC) for converting digital sample values of each orthogonal signal component into a into a corresponding analog signal component of the predistorted electrical signal for driving an optical modulation means so as to modulate a phase of an optical signal using a first one of the pair of analog signal components and modulate an amplitude of the optical signal using a second one of the pair of analog signal components to generate a corresponding predistorted optical signal for transmission through the optical communications system.

32. A dispersion compensator as claimed in claim 31, wherein the digital filter comprises any one of:
- a Fast Fourier Transform (FFT) filter;
- a Finite Impulse Response (FIR) filter; and
- a Infinite Impulse Response (IIR) filter.

33. A dispersion compensator as claimed in claim 31, wherein the orthogonal signal components comprise any one of:
- In-phase and Quadrature signal components;
- Amplitude and Phase signal components; and
- Amplitude and frequency signal components.

34. A dispersion compensator as claimed in claim 31, wherein the digital filter comprises either one of:
- a respective digital filter for generating each component; and
- a single digital filter configured to substantially simultaneously output a respective digital sample value for each component.

35. A dispersion compensator as claimed in claim 31, further comprising, for each component of the predistorted electrical signal, a respective second digital filter operatively coupled for imposing a predetermined delay.

36. A dispersion compensator as claimed in claim 35, wherein the respective predetermined delay imposed on each component is selected to compensate a differential propagation delay.

37. The dispersion compensator as claimed in claim 31, wherein the electrical input signal comprises a substantially undistorted binary signal and wherein the dispersion compensator further comprises a mapper for mapping the binary signal into a stream of n-bit symbols.

38. A dispersion compensator as claimed in claim 37, wherein the digital filter comprises:
- a serial-to-parallel converter for converting the stream of n-bit symbols into a series of N-bit words; and
- a Random Access Memory (RAM) Look-up table (LUT) for outputting at least one digital sample value of the predistorted electrical signal corresponding to each N-bit word.

39. A dispersion compensator as claimed in claim 38, wherein the look-up table comprises:
- two or more memory blocks for storing a respective portion of each digital sample value of the predistorted signal; and
- a summation circuit for summing the respective portions of the digital sample value output from each memory block.

40. A dispersion compensator as claimed in claim 31, wherein the optical modulation means comprises any one or more of:
- a narrowband laser configured to generate the optical signal having a frequency which is controllable in response to an analog current level of the predistorted electrical signal;
- an optical modulator configured to modulate either one or both of an amplitude and phase of the optical signal in response to an analog voltage level of the predistorted electrical signal; and
- a variable optical attenuator configured to modulate an amplitude of the optical signal in response to an analog voltage level of the predistorted electrical signal.

41. A dispersion compensator as claimed in claim 31, wherein the compensation processor further comprises a non-linear compensation means for adjusting each digital sample value of the predistorted electrical signal to compensate a nonlinear performance of at least the modulation means.

42. A dispersion compensator as claimed in claim 41, wherein the non-linear compensation means comprises:
- a non-linear processor for calculating a mapping between each sample value and a Corresponding adjusted sample value; and
- a non-linear compensator operatively coupled to an output of the digital filter for applying the mapping to each digital sample value of the predistorted electrical signal.

43. A dispersion compensator as claimed in claim 42, wherein the non-linear compensator comprises a Random Access Memory (RAM) Look-up table (LUT) for outputting an adjusted digital sample value corresponding to each digital sample value of the predistorted electrical signal generated by the digital filter.

44. A dispersion compensator as claimed in claim 41, wherein the digital filter is a Random Access Memory (RAM) Look-up table (LUT) configured to store a plurality of predetermined digital sample values of the predistorted electrical signal, and wherein the non-linear compensation means comprises:
- a non-linear processor for calculating a mapping between each sample value and a Corresponding adjusted sample value; and
- means for adjusting each of the predetermined digital sample values stored in the RAM LUT in accordance with the calculated mapping.

\* \* \* \* \*

UNITED STATES PATENT AND TRADEMARK OFFICE
CERTIFICATE OF CORRECTION

PATENT NO. : 9,559,778 B2
APPLICATION NO. : 10/531314
DATED : January 31, 2017
INVENTOR(S) : Kim B. Roberts et al.

Page 1 of 1

It is certified that error appears in the above-identified patent and that said Letters Patent is hereby corrected as shown below:

Column 13, Lines 39-40 Claim 9, Lines 4-5 should recite:
converting the stream of n-bit symbols into a series of N-bit words;

Column 13, Lines 49-50 Claim 11, Lines 1-2 should recite:
A method as claimed in claim 1, wherein the orthogonal signal components comprise any one of:

Column 13, Line 67 Claim 12, Line 14 should recite:
of an optical signal using a first one of the pair of Column 14, Lines 3-4 Claim 12, Lines 17-18 should recite:
a second one of the pair of orthogonal signal components of the predistorted electrical signal to generate a Signed and Sealed this
Thirteenth Day of June, 2017

Joseph Matal
*Performing the Functions and Duties of the*
*Under Secretary of Commerce for Intellectual Property and*
*Director of the United States Patent and Trademark Office*